Feb. 17, 1925.
E. SCHRÖDER
1,527,085
ELECTRIC WELDING OR HEATING MACHINE
Filed May 22, 1922
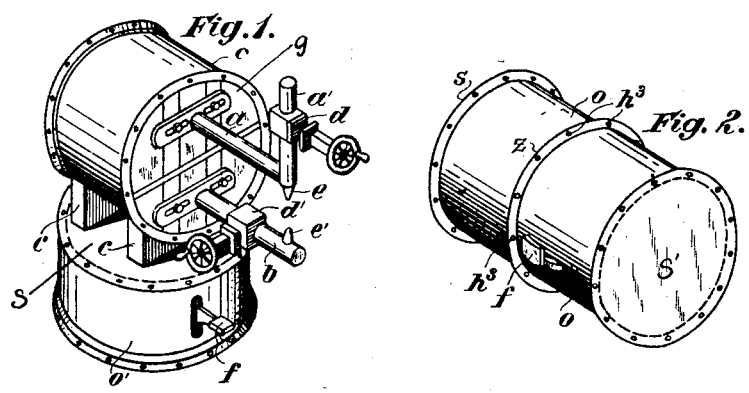
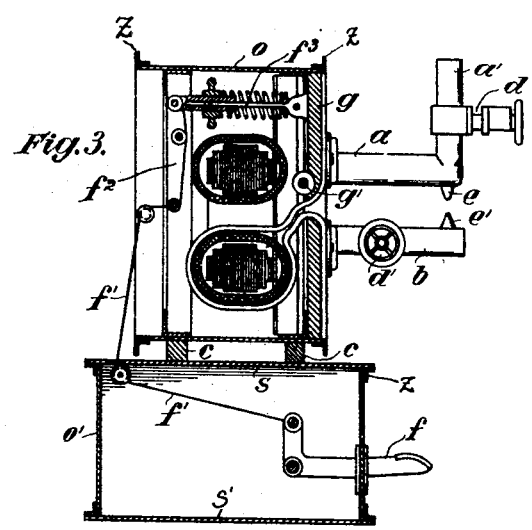
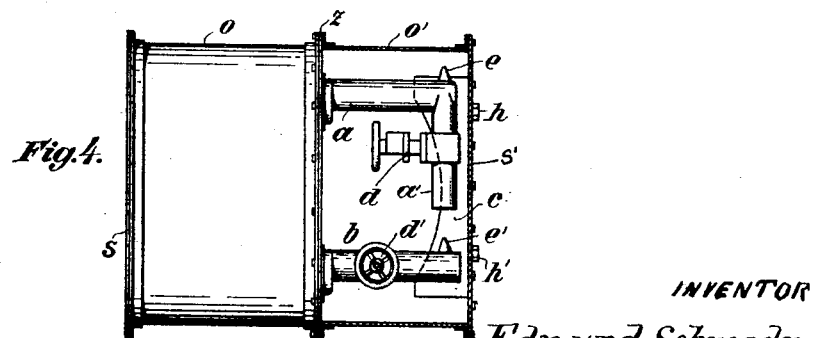
INVENTOR
Edmund Schroeder.
By William C. Linton
Atty.

Patented Feb. 17, 1925.

1,527,085

UNITED STATES PATENT OFFICE.

EDMUND SCHRÖDER, OF BERLIN, GERMANY, ASSIGNOR TO THE FIRM, BRAUN-BRÜNING & CO., OF BASEL, SWITZERLAND.

ELECTRIC WELDING OR HEATING MACHINE.

Application filed May 22, 1922. Serial No. 562,758.

*To all whom it may concern:*

Be it known that I, EDMUND SCHRÖDER, engineer, a citizen of the German Republic, residing at Berlin, in the Republic of Germany, have invented certain new and useful Improvements in Electric Welding or Heating Machines; and I do hereby declare that the following is a full, clear, and exact description of the invention, such as will enable others skilled in the art to which it appertains to make and use the same.

The present invention relates to electric welding and heating machines and more particularly to the manner of arranging the parts of such a machine in a suitable housing to facilitate the shipment of the same and permitting the machine to be readily accessible for use.

One of the principal objects of the present invention is to provide a frame or casing for such welding and heating machine which can be easily and readily packed in a compact form to facilitate the transportation of the same and protect the machine against moisture, dust and other foreign matter.

Another object of the invention is the provision of such a container or casing which will not only protect and house the machine during transportation but which, when open, will provide a suitable support for the machine, thereby rendering the latter readily accessible for use.

A further object of the invention is to provide a portable electric heating and welding machine wherein the parts thereof are so arranged and designed that a complete machine may be stored within a compact portable container and the latter when open providing a suitable stand or support for the machine.

Other objects will be hereinafter more fully pointed out when considering the following detailed description taken in connection with the accompanying drawings, in which:

Figure 1 is a perspective view of a point or butt-welding machine ready to be used;

Figure 2 is a similar view showing the machine properly housed for shipment;

Figure 3 is a vertical longitudinal section through Figure 1; and

Figure 4 is a side elevation of the machine when assembled and as shown in Figure 2, but having one section of the casing thereof in section.

Referring now to the accompanying drawings wherein like and corresponding parts are designated by similar reference characters throughout the several views, I have illustrated in Figures 1 to 4 inclusive the preferred form of the invention wherein the casing which is adapted to house and support the electric welding and heating machine is of a cylindrical configuration so that when it is assembled for shipment, it has the appearance of a barrel as is illustrated in Figure 2. This casing comprises two sections, one of which is known as the base section $o'$ and the other the body section $o$. These sections are provided with the flanges $z$ which are adapted to be connected by means of the bolts or rivets $h^3$ and their opposite ends are closed by means of the plates $s$ and $s'$. The body section $o$ carries the transformer and has supported in its inner end a wall or partition comprising a lower section which is fixedly mounted and an upper section $g$ which is pivotally supported as at $g'$.

An electrode carrier $a$ is detachably connected to the pivoted section $g$, whereas an electrode carrier $b$ is detachably connected to the fixed section of this wall. The electrode carrier $a$ is of a rectangular shape and its upwardly extending leg $a'$ carries a rotatable and displaceable clamping cheek $d$. The lower electrode carrier $b$ is also provided with a clamping cheek $d'$ and the carriers are provided with the welding electrodes $e$ and $e'$ located opposite to each other when in their operative position as is better illustrated in Figure 3. Connected to the semi-circular wall section $g$ is a resilient member $f^3$ which is adapted to normally retain this wall section $g$ in its closed position. Pivotally mounted within the body section $o$ is a double-armed lever $f^2$ and connected to one end of this lever $f^2$ is the resilient member $f^3$ whereas its opposite end is connected to a cord or cable $f'$. Pivotally supported within the base section $o'$ of the casing is a foot lever $f$ and the cable $f'$ is also connected to this foot lever whereby upon the depression of the foot lever, the lever $f^2$ will be caused to swing upon its pivoted connection thereby forcing the section $g$ of the wall out against the tension of the resilient member $f^3$ whereby the electrode $a$ will approach the electrode $b$. When the pressure upon the foot lever is released, the resilient member $f^3$ causes the electrode $a$ to assume its normal position as is shown.

In placing the welding machine in operative position, the sections of the casing are disconnected and the end plate $s'$ of the section $o$ is removed and the casing section $o'$ is placed thereupon as is illustrated in Figure 3. Detachably secured to the inner face of the plate $s$ are the ledges $c$, which ledges may be removed from the inner face of the plate $s$ and placed upon the outer face thereof whereby the body section $o$ of the casing may be supported thereon. The bolts or similar fastening elements $h$ and $h'$ are employed for connecting the ledges to the opposite faces of the plate $s$ as may be required. When the body section $o$ is placed in proper position upon the base section $o'$, the cable $f'$ is then so placed and connected that the foot lever $f$ will be operatively connected to the wall $g$ and when placing the electrodes in proper position, the apparatus may be used.

When it is desired to ship or store the machine, the electrode carrier $a$ is first detached from the wall $g$ and given a one-half turn so that when it is again attached to this wall $g$, it will assume the position as is illustrated in Figure 4. The ledges $c$ are then secured to the inner face of the plate $s'$ and the two sections of the casing are then connected together so that the electrodes will project within the section $o'$ of the casing and the ledges $c$ will be arranged on each side of the electrodes. The plate $s$ is then secured to the outer end of the section $o$ and the foot lever may be bent inwardly and locked in this position so as not to protrude too far from the side walls of the casing. The complete electric welding and heating machine is then stored within a barrel-like casing which may be easily handled during shipment and will take up but a comparatively small amount of space.

Having fully described my invention, what I desire to secure by a patent of the United States is:

1. An electric welding and heating machine comprising a casing, said casing comprising two sections, one of said sections adapted to support the electrodes of the welding machine and the other of said sections adapted to provide a support for the first mentioned section.

2. An electric welding and heating machine comprising a casing, said casing comprising a body section and a base section, means whereby said body section may be supported upon said base section and means for connecting said sections together whereby the electric welding and heating machine may be completely housed.

3. An electric welding and heating machine comprising a casing, said casing comprising two sections, electrodes supported by one of said sections, a foot pedal arranged within the other of said sections, and means for operatively connecting said foot pedal with one of said electrodes.

In witness whereof I have hereunto set my hand.

EDMUND SCHRÖDER